(12) United States Patent
Rodriguez Bravo et al.

(10) Patent No.: US 11,093,118 B2
(45) Date of Patent: Aug. 17, 2021

(54) GENERATING USER INTERFACE PREVIEWS

(71) Applicant: INTERNATIONAL BUSINESS MACHINES CORPORATION, Armonk, NY (US)

(72) Inventors: Cesar Augusto Rodriguez Bravo, Alajuela (CR); Shikhar Kwatra, Durham, NC (US); Liam S. Harpur, Dublin (IE); Adam Lee Griffin, Dubuque, IA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/432,256

(22) Filed: Jun. 5, 2019

(65) Prior Publication Data
US 2020/0387274 A1 Dec. 10, 2020

(51) Int. Cl.
*G06F 3/0484* (2013.01)
*G06F 3/0481* (2013.01)
*H04L 29/08* (2006.01)
*G06F 3/0483* (2013.01)
*G06F 40/14* (2020.01)
*G06N 3/04* (2006.01)

(52) U.S. Cl.
CPC .......... *G06F 3/0484* (2013.01); *G06F 3/0481* (2013.01); *G06F 3/0483* (2013.01); *G06F 40/14* (2020.01); *H04L 67/22* (2013.01); *G06N 3/04* (2013.01)

(58) Field of Classification Search
None
See application file for complete search history.

(56) References Cited

U.S. PATENT DOCUMENTS

| 8,745,520 | B2 | 6/2014 | Padgett et al. |
| 9,003,279 | B2 | 4/2015 | Peters et al. |
| 9,003,424 | B1 | 4/2015 | Mendes et al. |
| 9,063,757 | B2 | 6/2015 | Horton et al. |
| 9,729,843 | B1* | 8/2017 | Mosterman ......... H04N 9/8715 |
| 10,143,924 | B2 | 12/2018 | McKenzie et al. |
| 2007/0300179 | A1* | 12/2007 | Friedlander ......... G06F 9/45512 715/781 |
| 2008/0201206 | A1* | 8/2008 | Pokorney ............ G06F 16/9535 705/7.29 |
| 2011/0022964 | A1* | 1/2011 | Toebes ................... H04L 67/02 715/747 |

(Continued)

OTHER PUBLICATIONS

WalkMe Product updates (Jun. 2019-Sep. 2019) retrieved from [https://support.walkme.com] on [Apr. 8, 2020], 36 pages. (Year: 2019).*

(Continued)

*Primary Examiner* — Amy M Levy
(74) *Attorney, Agent, or Firm* — Brian Restauro; Andrew D. Wright; Roberts Calderon Safran & Cole, P.C.

(57) ABSTRACT

A computer-implemented method includes: determining, by a computer device, an interaction pattern of a website based on actions of plural users at the website; generating, by the computer device, a demonstration video based on the interaction pattern; and presenting, by the computer device, the demonstration video to a user visiting the website for a first time.

17 Claims, 9 Drawing Sheets

(56) References Cited

U.S. PATENT DOCUMENTS

| | | | |
|---|---|---|---|
| 2014/0006944 A1 | 1/2014 | Selig et al. | |
| 2014/0236875 A1* | 8/2014 | Phillipps | G06F 16/957 706/12 |
| 2014/0298162 A1* | 10/2014 | Cohen | G06Q 10/10 715/234 |
| 2014/0325398 A1* | 10/2014 | van de Bruggen | G06F 3/0484 715/760 |
| 2015/0058734 A1* | 2/2015 | Ward | G06F 9/451 715/731 |
| 2015/0095820 A1 | 4/2015 | Fellman | |
| 2015/0213840 A1* | 7/2015 | Innami | G11B 27/34 386/243 |
| 2015/0301729 A1* | 10/2015 | Wang | G06F 3/0485 715/707 |
| 2016/0019464 A1* | 1/2016 | Madhavan | G06F 16/951 706/11 |
| 2016/0140635 A1* | 5/2016 | Devageorge | H04L 67/02 705/26.41 |
| 2016/0246615 A1* | 8/2016 | Jemiolo | G06F 16/7837 |
| 2016/0261701 A1* | 9/2016 | Dhawan | H04N 19/91 |
| 2016/0283870 A1* | 9/2016 | Tomaszewski | G06Q 10/047 |
| 2017/0269945 A1* | 9/2017 | Patel | G06F 3/14 |
| 2018/0341378 A1* | 11/2018 | Morrow | G06F 9/44505 |
| 2019/0124167 A1* | 4/2019 | Reshef | H04L 43/00 |
| 2019/0196932 A1* | 6/2019 | Adika | G06F 8/38 |
| 2019/0325330 A1* | 10/2019 | Roy | G06F 40/284 |

OTHER PUBLICATIONS

Anonymous, Telerik, https://www.telerik.com/, accessed Jun. 4, 2019; 8 pages.

Anonymous, Automation Anywhere, https://www.automationanywhere.com/testing, accessed Jun. 4, 2019; 10 pages.

Anonymous, Wibbitz, https://www.wibbitz.com/, accessed Jun. 4, 2019; 9 pages.

Anonymous, hotjar, https://www.hotjar.com/, accessed Jun. 4, 2019; 7 pages.

Gilliam, 11 Visitor Recording and Session Replay Tools: An Overview, https://mopinion.com/author/erin-gilliam/, Aug. 15, 2017; 22 pages.

* cited by examiner

```
In [ ]: [
User Activity Information
{
    "User profile":
    {
       "_id": "89d200cfc5b714a835e1",
       "age": "28",
       "domain": "System programmer",
       "organization": "DB"
    },
    "activity": [
    {
       "time": "2018-08-07T11:12:33.345Z",
       "type": "Research",
       "content": "Programming"
    },
    {
       "time": "2018-08-07T11:13:23.125Z",
       "Type": "Ask question",
       "Content": "Who knows how to render JSON?"
    }
    ]
}
Activity status
{
    "time": "2018-08-07T11:12:35.345Z",
       "current_step": "3.1",
       "status": "in progress"
}
]
```

FIG. 6

```
# GRADED FUNCTION: model
def model(data, X_train, Y_train, X_test, Y_test, num_iterations = 2000, learning_rate = 0.5, print_cost = False):
    """
    Builds the logistic regression model
    Arguments:
        data -- text corpus
    X_train -- training set represented by a numpy array of message
    Y_train -- training labels represented by a numpy array (vector) of message
    X_test -- test set represented by a numpy array of message
    Y_test -- test labels represented by a numpy array (vector) of message
    num_iterations -- hyperparameter representing the number of iterations to optimize the parameters
    learning_rate -- hyperparameter representing the learning rate used in the update rule of optimize()
    print_cost -- Set to true to print the cost every 100 iterations Returns:
    d -- dictionary containing information about the model.
    """

START CODE HERE ###
    # initialize parameters with zeros
    w, b = initialize_with_zeros(X_train.message[0])
    # Gradient descent
    parameters, grads, costs = optimize(w, b, data, X_train, Y_train, num_iterations, learning_rate, print_cost = False)
    # Retrieve parameters w and b from dictionary "parameters"
    w = parameters["w"]
    b = parameters["b"]
    # Predict test/train set examples
    Y_prediction_test = predict(w, b, data, X_test)
    Y_prediction_train = predict(w, b, data, X_train)
    ### END CODE HERE ###

# Print train/test Errors
    print("train accuracy: {} %".format(100 - np.mean(np.abs(Y_prediction_train - Y_train)) * 100))
    print("test accuracy: {} %".format(100 - np.mean(np.abs(Y_prediction_test - Y_test)) * 100))
    d = {"costs": costs,
         "Y_prediction_test": Y_prediction_test,
         "Y_prediction_train" : Y_prediction_train,
         "w" : w,
         "b" : b,
         "learning_rate" : learning_rate,
         "num_iterations": num_iterations}
    return d
```

FIG. 8

GENERATING USER INTERFACE PREVIEWS

BACKGROUND

The present invention relates generally to user interfaces and, more particularly, to automatically generating user interface previews for users navigating in websites.

User experience on websites improves by minimizing the time to understand the website and its uses and features. From the user perspective, simplicity and clarity are factors that affect the user experience at a website.

Conventional methods of website personalization focus on tailoring the web experience to a particular user or set of users. This may include changing the user interface (UI) based on various criteria such as: user demographics; static profiles and correlation to web content; session history and usage statistics; rating, preferences, and predicted preferences; and correlation of user and content, e.g., via data mining to derive a probability of use of a website object at a certain time. This personalization typically changes one or more of the links, content, advertisements, and graphics in a website, or rearranges certain objects in the website.

SUMMARY

In a first aspect of the invention, there is a computer-implemented method including: determining, by a computer device, an interaction pattern of a website based on actions of plural users at the website; generating, by the computer device, a demonstration video based on the interaction pattern; and presenting, by the computer device, the demonstration video to a user visiting the website for a first time.

In another aspect of the invention, there is a computer program product including a computer readable storage medium having program instructions embodied therewith. The program instructions are executable by a computer device to cause the computer device to: determine via crowdsourcing an interaction pattern of user actions at a website; generate a demonstration video based on the interaction pattern; detect a user visiting the website for a first time; and present the demonstration video to the user visiting the website for a first time.

In another aspect of the invention, there is system including a processor, a computer readable memory, and a computer readable storage medium. The system includes: program instructions to monitor actions of a user at plural websites; program instructions to determine an interaction pattern based on the monitoring; program instructions to generate a demonstration video for a website based on the interaction pattern; and program instructions to present the demonstration video when the user visits the website. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 6 shows an exemplary JSON message structure in accordance with aspects of the invention.

FIG. 8 shows pseudocode for implementing the neural network in accordance with aspects of the invention.

DETAILED DESCRIPTION

Figure 1:
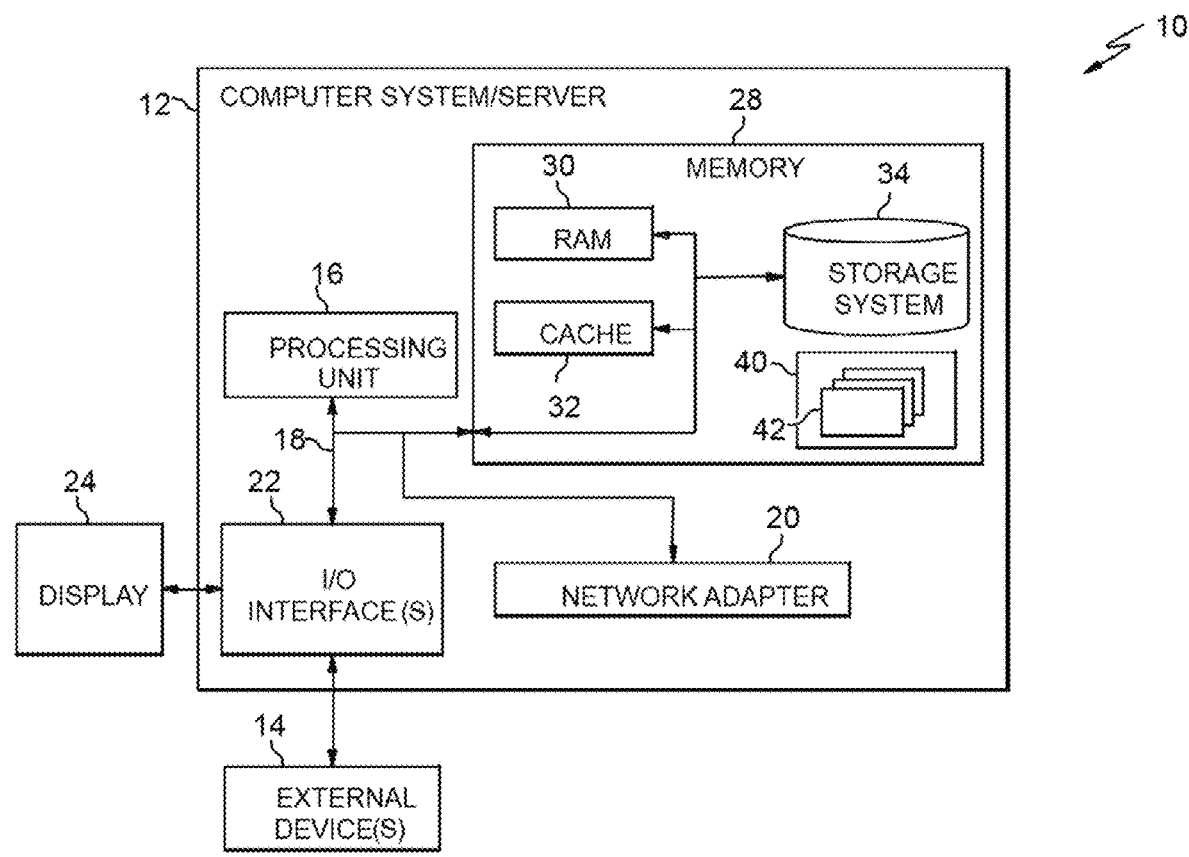
FIG. 1 depicts a computer infrastructure according to an embodiment of the present invention.

The present invention relates generally to user interfaces and, more particularly, to automatically generating user interface previews for users navigating websites. According to aspects of the invention, there is a system and method that automatically and dynamically creates a preview video for a website that is shown to a user when the user first visits the website (or when the user revisits the website after a substantial change to the website has occurred since the user's most recent visit). In some embodiments, the preview video is created based on analyzing prior work processes of the user at other websites. In other embodiments, the preview video is created based on analyzing prior work processes of other users at the website being visited for the first time by the user. In this manner, implementations of the invention generate a tailored video that is presented to a user to advantageously minimize the time and confusion the user endures when visiting a website for the first time.

Website developers regularly update content and style of a website based on feedback and statistics because they want to meet the goals of the website (e.g., a designated number of visitors, profitability of the website, or increase the browse time of the visitor). Unfortunately, website owners often overlook the user experience on the website. Aspects of the invention are directed to creating a preview video (also referred to herein as a demonstration video) for a user when the user first visits a website, which results in more efficient browse/interaction time for the user (e.g., an improved user experience) as they are understanding the layout and capabilities of the website. This video advantageously reduces the number of users who navigate away from a website within minutes (or even seconds) of first visiting the website because the website is too difficult to understand.

Aspects of the invention are directed to a system and method for creating a short and informative demonstration video to increase the probability that a user that is new to a website has a productive and insightful visit to the website. In some embodiments, the video is based on a determined pattern by which this particular user interacts with content on other websites. For example, by analyzing how this user navigates through other websites, the system might determine that this user is most likely to first read ContentType1, then work with ContentType2, then interact with ContentType3. In this example, the system creates a video that shows a demonstration of performing these actions in this order on the current website, and the system presents the video to the user when the user visits the website for the first time (or when the user revisits the website after a substantial change). In this manner, the system provides the user with a quick and informative video of interacting with the website that is based on analyzing how this user interacts with other websites. The video assists in acclimating the user to the website, thereby reducing the amount of time spent (and frustration endured) by the user trying to figure out how to do what the user is most likely to do at this website.

In other embodiments, the video is based on a determined pattern by which users interact with the website the particular user is currently visiting. For example, the system might determine that 80% of users at this website perform Action1, then Action2, then Action3. In this example, the system creates a video that shows a demonstration of performing these actions in this order on this website, and the system presents the video to the user when the user visits the website for the first time (or when the user revisits the website after a substantial change). In this manner, the system provides the user with a quick and informative video of interacting with the website that is based on analyzing how most other users interact with the same website. The video assists in acclimating the user to the website, thereby reducing the amount of time spent (and frustration endured) by the user trying to figure out how to do the most common action at this website.

Aspects of the invention are directed to a system for facilitating the dynamic development of a self-evolving demonstration video that leverages system data such as Internet cookies and cache, to provide a user with the most current tutorials available since the user's last visit to the website. In one embodiment, the system includes a client-side browser plug-in. In another embodiment, the system includes a server-side implementation in which the involved users submit their browser histories to the server.

To the extent implementations of the invention collect, store, or employ personal information provided by, or obtained from, individuals (for example, Internet cookies, cache, browsing history, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Embodiments of the invention improve the technology of websites by providing users with dynamically created videos that illustrate common ways of navigating through a particular website. Embodiments of the invention employ an unconventional arrangement of steps including: determining, by a computer device, an interaction pattern of a website based on actions of plural users at the website; generating, by the computer device, a demonstration video based on the interaction pattern; and presenting, by the computer device, the demonstration video to a user visiting the website for a first time. The steps themselves are unconventional, and the combination of the steps is also unconventional. For example, the step of generating the video creates new information that does not exist in the system, and this new information is then used in subsequent steps in an unconventional manner. Embodiments of the invention also utilize elements and/or techniques that are necessarily rooted in computer technology, including presenting videos embedded in, or overlaid on, websites, using neural networks, and performing K-means clustering.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
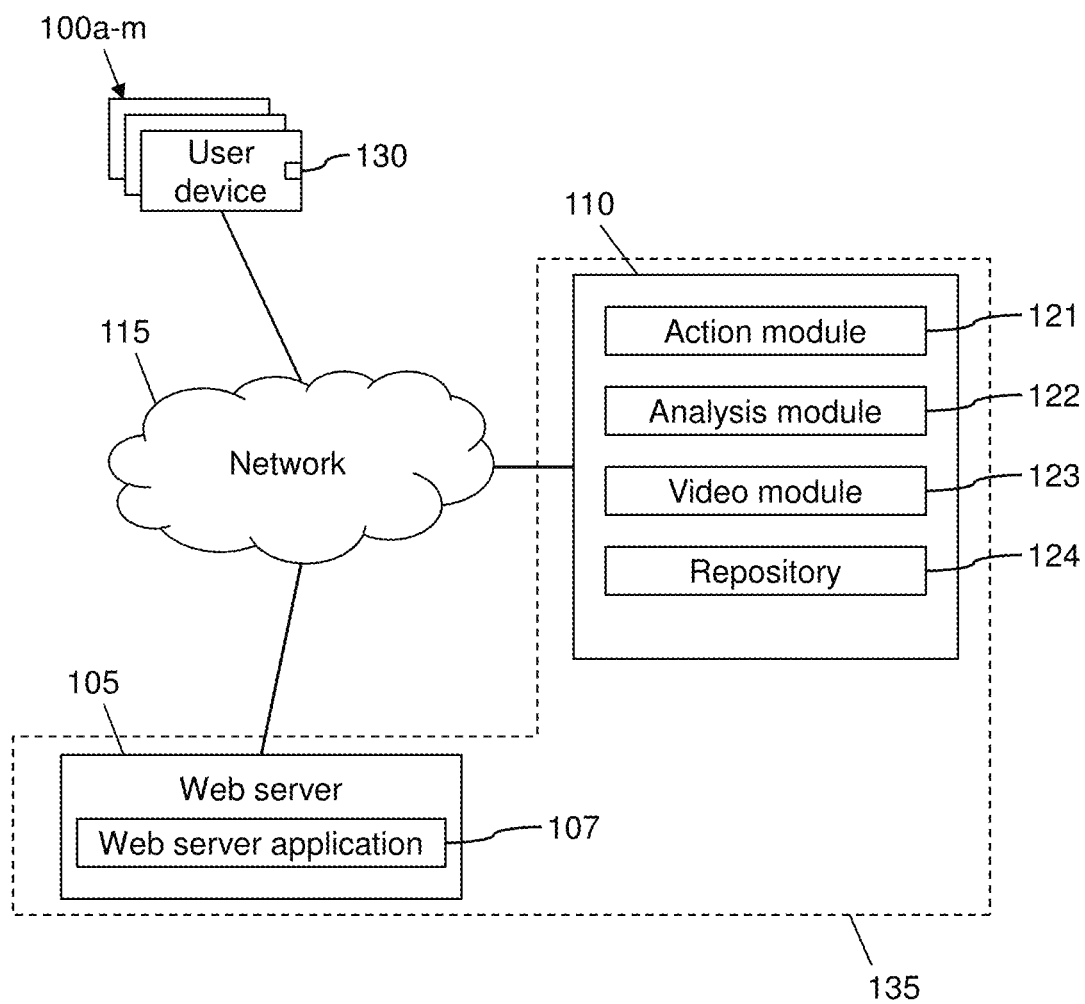
FIG. 2 shows a block diagram of an exemplary environment in accordance with aspects of the invention.

FIG. 2 shows a block diagram of an exemplary environment in accordance with aspects of the invention. The environment shown and described with respect to FIG. 2 corresponds to an embodiment in which demonstration videos are generated based on crowdsourced data for a single website. In embodiments, the environment includes a plurality of user devices 100a-m, a web server 105, and a video server 110 all connected to a network 115. The network 115 comprises a communication network including one or more of a LAN, WAN, and the Internet.

The web server 105 comprises a computer device (e.g., such as computer system 12 of FIG. 1) that hosts a website. For example, the web server 105 may store and run a web server application 107 (e.g., web server software) that satisfies client requests by storing, processing, and delivering webpages to clients, e.g., using the Hypertext Transfer Protocol (HTTP). In accordance with aspects of the invention, the website hosted by the web server 105 includes a plurality of website components which may include but are not limited to: pictures, tables, paragraphs, hyperlinks, Cascading Style Sheets (CSS), Hypertext Markup Language (HTML) elements, and JavaScript elements.

Each user device 100a-m is a computer device such as a smartphone, tablet computer, laptop computer, or desktop computer that includes one or more elements of computer system 12 of FIG. 1. Respective users utilize their respective user devices 100a-m to visit the website hosted by the web server 105 in a conventional manner. In embodiments, the respective users utilize their respective user devices 100a-m to interact with the website components of the website hosted by the web server 105. This interaction may include but is not limited to: navigating within the website via links in the website; providing input to the website (e.g., via text fields, selectable elements such as buttons, drop down menus, etc.); reading text on the website; viewing pictures on the website; viewing videos on the website; and listening to audio on the website.

According to aspects of the invention, the video server 110 is a computer device that is configured to generate a demonstration video for a user who is visiting the website hosted by the web server 105. In implementations, the video server 110 is a computer device that comprises one or more elements of computer system 12 of FIG. 1, which stores and runs one or more program modules that perform functions described herein. In embodiments, the video server 110 comprises an action module 121, an analysis module 122, and a video module 123, each of which comprises one or more program modules such as program module 42 as described with respect to FIG. 1.

In embodiments, separate modules of the video server 110 may be integrated into a single module. Additionally, or alternatively, a single module of the video server 110 may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Still referring to FIG. 2, in accordance with aspects of the invention, the action module 121 is configured to track all actions performed by the respective users (e.g., via the user devices 110a-n, for example) at the website hosted by the web server 105. In embodiments, when a user accesses the website via their user device, the action module 121 detects and stores data defining the user's actions within the website, such actions including at least one of: navigating within the website via links in the website; providing input to the website (e.g., via text fields, selectable elements such as buttons, drop down menus, etc.); reading text on the website; viewing pictures on the website; viewing videos on the website; and listening to audio on the website. In embodiments, the action module 121 determines a time that each such action is performed in the website and saves data defining a timestamp for each action. In this manner, the action module 121 determines a sequence of the actions taken by each user at the website, and an amount of time spent performing each such action. In embodiments, action module 121 stores data defining the actions (e.g., type or action, time of action, etc.) in a repository 124, which may be a storage system 34 as described with respect to FIG. 1. In embodiments, the data stored in the repository is anonymized, meaning that identities of the users of the user devices 100a-n are not stored in the repository 124.

With continued reference to FIG. 2, according to aspects of the invention, the analysis module 122 is configured to determine an interaction pattern for the website based on the user action data obtained by the action module 121. In embodiments, the analysis module 122 analyzes the data stored in the repository 124 to determine the most common interaction pattern of users that visit the website hosted by the web server 105. The analysis module 122 may be programmed with any suitable logic for performing the analysis, including but not limited to neural network techniques as described herein.

In accordance with aspects of the invention, the video module 123 is configured to generate a demonstration video based on the interaction pattern determined by the analysis module 122. In embodiments, the demonstration video includes video screen captures of the sequence of actions defined by the interaction pattern. In an illustrative exemplary use case, the analysis module 122 determines that the interaction pattern for the website is: the sequence of navigating to SubpageA via MenuLinkA, then entering text into Field1, then clicking a Submit button, and lastly scrolling to the bottom of the page. In this exemplary use case, the video module 123 generates a video that visually shows the website as a user goes through the steps of navigating to SubpageA via MenuLinkA, then entering text into Field1, then clicking the Submit button, and then scrolling to the bottom of the page. In embodiments, the video server automatically generates the demonstration video using video recordings of the website during user interactions with the website, referred to as visitor recordings, although other methods of video generation may be used.

According to aspects of the invention, the web server 105 detects when a user device (e.g., user device 100m) is visiting the website hosted by the web server 105 for the first time. This first time visitor detection may be accomplished using cookies, for example. In embodiments, based on this detecting of a first time visitor, the web server 105 obtains the demonstration video from the video server 110 and plays the demonstration video to the user that is visiting the website hosted by the web server 105. For example, the web server 105 may cause the demonstration video to be played in or over the display of the website on the user device 100m. In this manner, when a user visits the website for a first time, the user is provided with a demonstration video that visually depicts the determined interaction pattern for the website.

In accordance with further aspects of the invention, the system is configured to determine when a same user revisits the website after the demonstration video has been previously presented to this user. This may be performed using browsing data including at least one of cookies, cache, and browsing history information, for example. In embodiments, the system does not present the same demonstration video to the user on such subsequent visits, since users typically do not like to see the same instructional materials repeatedly. However, in the event the website undergoes a substantial change, then the system may update the demonstration video and present the updated demonstration video to the user the next time the user visits the website after the change. A substantial change in this regard may refer to a change of the website that affects one of the components that is displayed in the demonstration video. For example, if the demonstration video shows how to navigate to SubpageB using LinkZ, and if the visual appearance and/or location of LinkZ is changed in the website, then in aspects the system updates the demonstration video to show navigating to SubpageB using the changed version of LinkZ, and presents the updated demonstration video to the user the next time the user visits the website.

In accordance with further aspects of the invention, the video server 110 is configured to categorize users into groups and generate different demonstration videos for the same website for each of the different groups. In this manner, different types of users are presented with different demonstration videos when they first visit the website hosted by the web server 105. In embodiments, for each user that visits the website, the action module 121 obtains browsing data from the user device, the browsing data including at least one of cookies, cache, and browsing history information, for example.

In embodiments, the analysis module 122 analyzes the browsing data using clustering techniques, such as K-means clustering, to determine groups of the users based on the browsing data. Then, for each determined group, the analysis module 122 determines an interaction pattern (e.g., in the manner described herein) by analyzing the actions performed at the website by only the members of the group. Then, for each determined group, the video module 123 generates a demonstration video for the interaction pattern of that group. In this manner, the system determines groups of users, determines a unique interaction pattern for each group, and generates a unique demonstration video for each group. Then, when a new user is detected at the website, the system determines which one of the groups the user belongs in (e.g., based on the new user's browsing data and using the same clustering as used to determine the groups), and then presents the unique demonstration video for that determined group to the new user via the website. In this embodiment, each user device 100a-m may be equipped with a plug-in 130 that provides the browsing history information to the video server 110. In a preferred embodiment, either the plug-in 130 or the video server 110 anonymizes the browsing data, such that the identity of the user is not stored in, or used by, the system in carrying out aspects of the invention.

Still referring to FIG. 2, in embodiments the web server 105 and the video server 110 exchange data via the network 115 in performing certain ones of the functions described herein. For example, the web server 105 may include software that tracks every action made by a user in the website, and the web server 105 may transmit this information to the video server 110 for use by the various modules therein in performing aspects of the invention as described herein.

In some embodiments, the web server 105 and the video server 110 are separate physical computer devices. In a cloud computing implementation, the web server 105 and the video server 110 are at least one of owned, operated, and maintained by a service provider that provides Infrastructure as a Service (IaaS) cloud services to customers including the owner of the website that is hosted on the web server 105. In another embodiment, the web server 105 and the video server 110 are combined into a single computing device that runs the web server application 107, the action module 121, the analysis module 122, and the video module 123. In yet another embodiment, the web server 105 and the video server 110 are separate virtual machines running on the same (or different) computing devices, e.g., as diagrammatically indicated by box 135.

Figure 3:
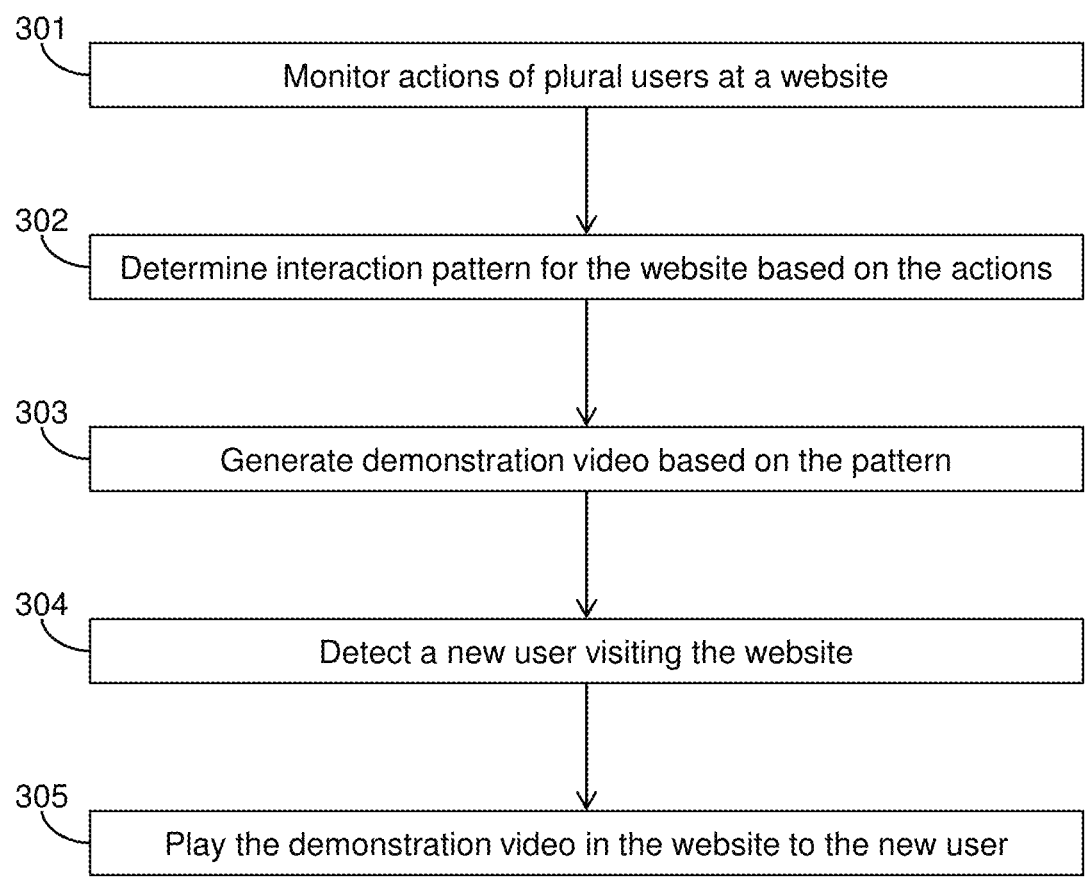
FIG. 3 shows a flowchart of an exemplary method in accordance with aspects of the invention.

FIG. 3 shows a flowchart of an exemplary method in accordance with aspects of the present invention. Steps of the method may be carried out in the environment of FIG. 2 and are described with reference to elements depicted in FIG. 2.

At step 301, the system monitors actions of plural users at a website. In embodiments, and as described with respect to FIG. 2, the action module 121 monitors the all actions performed by users in the website hosted by the web server 105. In embodiments, the action module obtains data defining the actions from the web server 105 and stores that data in the repository 124.

At step 302, the system determines an interaction pattern for the website based on the actions of the plural users at a website. In embodiments, and as described with respect to FIG. 2, the analysis module 122 analyzes the data stored in the repository 124 to determine at least one interaction pattern. In embodiments, the analysis includes neural networking techniques for performing pattern recognition in the stored interaction data. Implementations are not limited to neural networking based analysis, and other techniques may be used to determine the interaction pattern based on the stored interaction data. In some embodiments, the analysis module categorizes the users (e.g., using clustering) and determines an interaction pattern for each category of user. In embodiments, step 302 comprises determining the interaction pattern via crowdsourcing since it is based on actions of plural users at the same website.

At step 303, the system generates a demonstration video based on the determined interaction pattern. In embodiments, and as described with respect to FIG. 2, the video module creates a demonstration video that includes video recordings (e.g., screen recordings) of the website during user interactions with the website, the video recordings corresponding to the website components and/or navigation defined by the interaction pattern. In embodiments where plural interaction patterns are determined at step 302, step 303 comprises creating a respective demonstration video for each one of the plural interaction patterns. In accordance with aspects of the invention, steps 302 and 303 are performed automatically by the system, e.g., without input from a human user in determining an interaction pattern and/or generating the video.

At step 304, the system detects a new user at the website. In embodiments, and as described with respect to FIG. 2, the web server 105 detects a user device accessing the website for a first time based on, for example, browsing history information of the user device.

At step 305, based on the detecting at step 304, the system plays the demonstration video to the user visiting the website for the first time. In embodiments, and as described with respect to FIG. 2, the video server 110 provides the demonstration video to the web server 105, which causes the demonstration video to play in the user interface of the user device (e.g., the web browser) that is displaying the website. In embodiments where plural interaction patterns are determined at step 302 and plural demonstration videos are generated at step 303, step 305 comprises determining which one of the categories the new user is grouped in, and providing the demonstration video for that particular category to the user.

In accordance with aspects of the invention, step 305 is performed within a predefined amount of time after the user first visits the website. In embodiments, the predefined amount of time is less than one minute after the user first accesses the website, although another predefined amount of time may be used. In this manner, the user is presented with the demonstration video relatively quickly upon their first landing at the website, so that the user is provided with this information before becoming frustrated and navigating away from the website.

Figure 4:
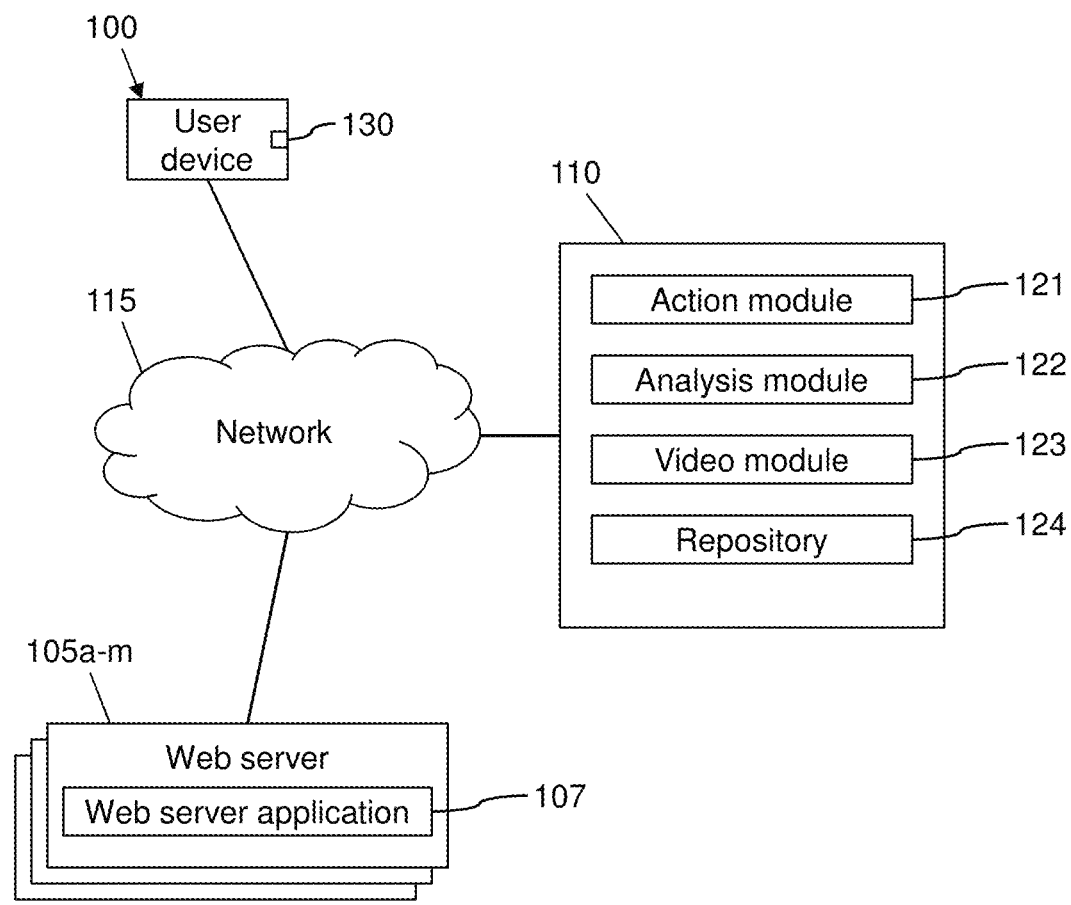
FIG. 4 shows a block diagram of an exemplary environment in accordance with aspects of the invention.

FIG. 4 shows a block diagram of an exemplary environment in accordance with further aspects of the invention. The environment shown and described with respect to FIG. 4 corresponds to an embodiment in which a demonstration video is generated based on data of a single user across plural different websites. In embodiments, the environment includes a user device 100, a plurality of web servers 105a-m, and a video server 110 all connected to a network 115. The network 115 comprises a communication network including one or more of a LAN, WAN, and the Internet.

Each web server 105a-m hosts a respective website. For example, each web server 105a-m may comprise a computer device that stores and runs a respective web server application 107 (e.g., web server software) that satisfies client requests by storing, processing, and delivering webpages to clients, e.g., using the Hypertext Transfer Protocol (HTTP). In accordance with aspects of the invention, each website hosted by one of the web servers 105a-m includes a plurality of website components which may include but are not limited to: pictures, tables, paragraphs, hyperlinks, Cascading Style Sheets (CSS), Hypertext Markup Language (HTML) elements, and JavaScript elements.

The user device 100 is a computer device such as a smartphone, tablet computer, laptop computer, or desktop computer that includes one or more elements of computer system 12 of FIG. 1. In implementations, the user of the user device 100 utilizes the user device 100 to visit and interact with the respective websites hosted by the respective web servers 105a-m. This interaction may include but is not limited to: navigating within the website via links in the website; providing input to the website (e.g., via text fields, selectable elements such as buttons, drop down menus, etc.); reading text on the website; viewing pictures on the website; viewing videos on the website; and listening to audio on the website. In embodiments, a plug-in 130 (e.g., web browser plug-in), browser extension, or other component on the user device 100 communicates, to the video server 110, data defining the interactions taken by the user device 100 at the websites hosted by the web servers 105a-m.

The video server 110 shown in FIG. 4 is similar to the video server 110 described with respect to FIG. 2, and may include the action module 121, analysis module 122, video module 123, and repository 124 as already described herein. According to aspects of the invention, in the embodiment shown in FIG. 4, the action module 121 obtains the interaction data from the plug-in 130 of the user device 100 and stores the interaction data in the repository. In contrast to the embodiment of FIG. 2, in which the interaction data is that of plural different users at a single website, in the embodiment of FIG. 4 the interaction data is that of the single user at plural different websites.

In the embodiment shown in FIG. 4, the analysis module 122 analyzes the interaction data of the single user from plural websites to determine an interaction pattern for this user. In embodiments, the analysis includes neural networking techniques for performing pattern recognition in the stored interaction data. Implementations are not limited to neural networking based analysis, and other techniques may be used to determine the interaction pattern based on the stored interaction data.

Still referring to the embodiment shown in FIG. 4, the video module 123 is configured to generate a demonstration video for a website based on the interaction pattern when the user first visits the website. In implementations, the plug-in 130 determines when the user device 100 first visits a website hosted by one of the web servers 105a-m, and communicates an indication of the website to the video server 110. Upon receipt that the user device 100 is visiting the indicated website for the first time, the video module 123 generates a demonstration video for the indicated website based on the interaction pattern determined for this user.

In one example of creating the demonstration video, each web server stores tagged video snippets of interactions that users have performed at the website, and the video module 123 obtains a subset of the video snippets that correspond to the interactions defined by the interaction pattern for this user. The video module 123 then creates the demonstration video by stitching together the obtained video snippets in a sequence defined by the interaction pattern for this user. The video module 123 then causes the demonstration video to be played in the user interface (e.g., the web browser) of the user device 100, either by communicating the demonstration video directly to the plug-in 130 or by communicating the demonstration video to the web server hosting the website. Implementations of the invention are not limited to this exemplary method for creating the demonstration video, and other methods may be employed.

Figure 5:
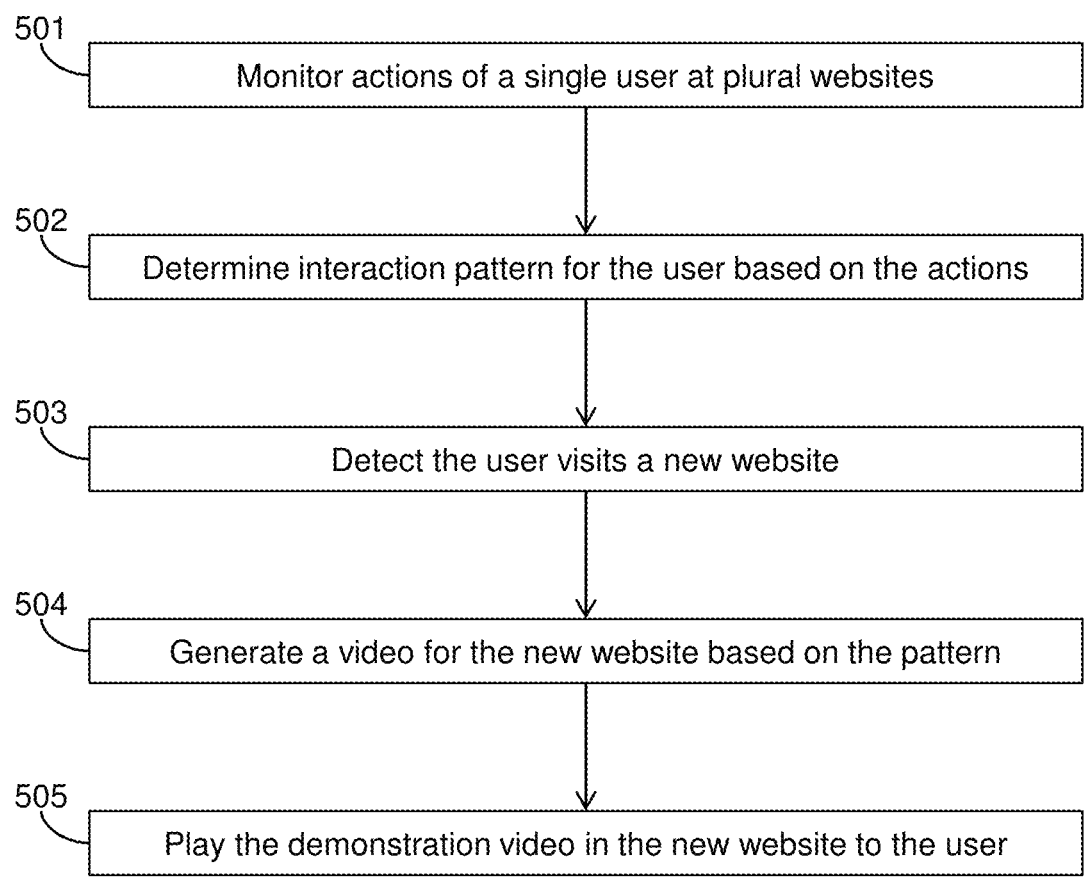
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 501, the system monitors actions the single user at plural websites. In embodiments, and as described with respect to FIG. 4, the action module 121 obtains browsing interaction data from the plug-in 130 on the user device 100.

At step 502, the system determines an interaction pattern for the user based on the actions from step 501. In embodiments, and as described with respect to FIG. 4, the analysis module 122 determines the interaction pattern by analyzing the browsing interaction data using neural network techniques, for example.

At step 503, the system determines the user visits a website for the first time. In embodiments, and as described with respect to FIG. 4, the plug-in 130 determines when the user device 100 visits a website that has not been visited previously by the user device 100. In embodiments, step 503 includes the plug-in 130 transmitting an indication of the website to the video server 110.

At step 504, the system generates a demonstration video for the user for the website identified at step 503. In embodiments, and as described with respect to FIG. 4, the video module 123 creates the demonstration video based on the indicated website and the interaction pattern determined at step 502. In accordance with aspects of the invention, steps 502 and 504 are performed automatically by the system, e.g., without using input from a human user in determining an interaction pattern and/or generating the video.

At step 505, the system plays the demonstration video for the user. In embodiments, and as described with respect to FIG. 4, the video module 123 causes the demonstration video to be played for the user in the user interface showing the website.

In accordance with aspects of the invention, step 505 is performed within a predefined amount of time after the user first visits the website. In embodiments, the predefined amount of time is less than one minute after the user first accesses the website, although another predefined amount of time may be used. In this manner, the user is presented with the demonstration video relatively quickly upon their first landing at the website, so that the user is provided with this information before becoming frustrated and navigating away from the website.

In accordance with aspects of the invention, the interaction data is structured and analyzed to remove information that is not useful to determining the interaction pattern, and to focus on activities such as site browsing specific related information. FIG. 6 shows an exemplary JSON message structure with such analytics that include determining: a user profile including an anonymized ID, an age, a group (domain), and an organization; an activity time, type, and content for each interaction at a website; and an activity status including time, current step, and status.

In a particular embodiment, the system builds, based on statistics, the flow or order in which the users are likely to interact with a website. As described herein, the system categorizes the users via K-means clustering and weighted based on their website visit frequencies to gauge their familiarity (e.g., personal and/or technical familiarity) with the website's components (e.g., features, interfaces, etc.), and to introduce additional efficiency statistics based off a particular user's frequent actions with website content to better interpret those actions for more applicable demonstration video content production.

For example, user-A has the following content viewing as it relates to "Programming" (probabilistic based on previous statistics and the content of the Calendaring, Scheduling system and current work activity):

TABLE 1

| ContentType | Characteristics |
| --- | --- |
| Programming contests | 10% time viewing; |
| Programming idioms | 10% time viewing; |
| Programming languages | 50% time editing; Research |
| Programming paradigms | 20% time viewing; |
| Programming music | 10% time listening; |

Based on the information in the table, the website that is expected to be viewed will have a correlation analysis built off previous user (e.g., offline) interaction. In embodiments, that gap analysis is used to infer an experience state for the studied website that is likely to be acceptable to the user at the specified time.

Figure 7:
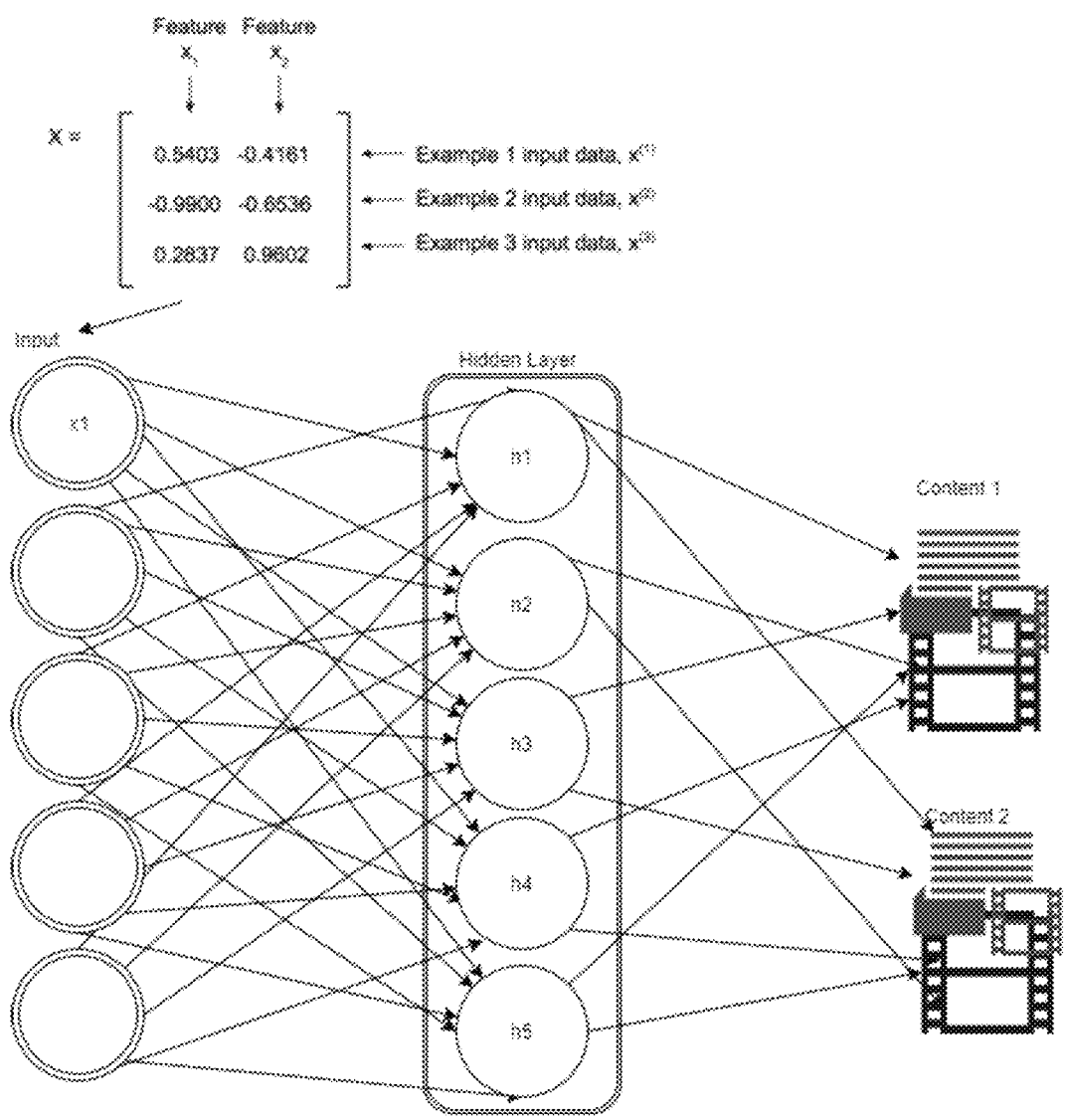
FIG. 7 shows a block diagram of neural network in accordance with aspects of the invention.

Continuing this example from the table, the features X1-X5 can include the following parameters:

X[1]—Time in viewing programming contests
X[2]—Programming idioms
X[3]—Programming languages
X[4]—Programming paradigm
X[5]—Programming music FIG. 7 diagrammatically illustrates using neural network techniques to determine the interaction pattern from the interaction data, and FIG. 8 shows exemplary pseudocode for implementing this step.

In embodiments, changes to the visual and behavioral aspects of the demonstration video are passed over to a client side engine or passed over to the website owner or a third party service. In a particular embodiment, the request for a demonstration video change is passed over to the website owner for rendering. Over time, the system evolves preferred demonstration videos or states for specific websites such that the website owner has pre-made videos. Additional demonstration video changes can include but are not limited to: grammar and linguistic preferences; content and topic preferences (e.g. export of certain content from other liked content); back end data and links and plugin or embedded experiences; changing the layout and text and controls and advertisements; and generalized audience and/or User targeted/specific demo creations.

According to aspects of the invention, the demonstration videos are updated based on the user. In this manner, if a section of the website of interest of the user is updated, then the system generates an updated demonstration video for this user to show the new features, functionality, and/or content to the user. However, other users that do not have interest in the new features, functionality, and/or content are not presented with a new demonstration video. In this manner, the system generates and plays a first demonstration video to a user when a user first visits a website. Then, as the user subsequently visits the same website, while the website remains substantially unchanged, the system does not play the demonstration video to the user. Then, based on the website being changed in a manner that affects the determined interaction pattern of the user, and the user visiting the website for a first time after this change, the system generates and plays a second (updated) demonstration video to the user.

Figure 9:
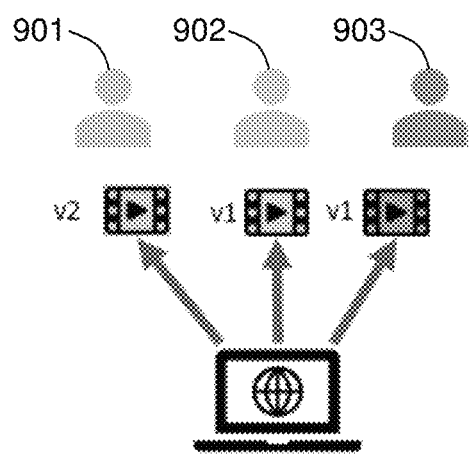
FIG. 9 illustrates an exemplary user case in accordance with aspects of the invention.

For example, in some embodiments the system updates the demonstration video of a website for respective users based on an interest or profile of each respective user. In an exemplary use case illustrated in FIG. 9, three users 901, 902, 903 visit a website after the website undergoes a change, e.g., as described herein. In embodiments, the system determines whether the change to the website changes an object of interest to each user 901-903. On the one hand, for user 901 for which the website change includes a change of an object of interest to the user, the system updates the demonstration video and shows the updated demonstration video to that user. On the other hand, for users 902 and 903 for which the website change does not include a change to an object of interest to the user, the system does not show the updated the demonstration video to those users. In this manner, if a section of the page of interest of the user gets updated, then the user will get an updated video to show the new features/functionality or content; however other users that does not have interest on that resource will not get this update. In embodiments, the system determines the website objects of interest to each user based on determined interests of each user and/or a user profile of each user.

In this manner, embodiments of the invention are configured to: determine a change in the website; update the demonstration video based on the change; determine the change is a change of interest to a first user; determine the change is not a change of interest to a second user; and present the updated demonstration video to the first user a next time the first user visits the website after the determining the change in the website, without presenting the updated demonstration video to the second user a next time the second user visits the website after the determining the change in the website. In embodiments, the determining the change comprises determining a change in a website component included in the demonstration video, and the determining the change is a change of interest to the first user is based on a profile of the first user.

An exemplary use case is described to illustrate aspects of embodiments of the invention. In this example, Website3 allows users to post questions and receive responses related to programming topics. The website also permits users to search for specific products and information. User-A has previously interacted with content in local documents according to the order depicted in Table 1.

In this use case, the system has aggregated information on the route taken by users through the associated content of Website3. This can be stored at the video server or at the web server. Based on this, the system maps the variation of timing, content and behaviors, and implements gap analysis. In one of the gap analysis, the system determines that a significant activity from the user (as seen in offline activity) is not present on the website. The system gauges if the demonstration video should show the user using external content in the demonstration video. Knowing the maximum and minimum values, and the position the user is in for the activity, allows the system to pick equivalent tasks.

Still referring to the exemplary use case, the variation in the demonstration video may be implemented in a J2EE architecture by having the system swap in and out different versions of the website functionality, though other implementations are possible. Additionally, this may be handled at the client side.

In embodiments, the system takes into account that the speed at which the video functionality changes (e.g., from website task to website task) is also influenced by the likely response of the user. For example, depending on configuration, if a user has known completion statistics, then the rate at which the tasks are rendered. Variables such as the following can be used to speed up or slow down the absorption or expulsion of the behavior/content: user or social network rating; facial response; and derived rating (e.g. aggregate of time spent on website, probabilistic based on similarity of website with a user rating) Likewise, in real time while viewing the video, a user can rate the experience (e.g., at an overall website or web page or object level) and thus allow the system to apply an adaptation to the low rated content to make it more like the higher rated videos.

In another exemplary use case, User-A performs normal day-to-day browsing activity, e.g., using their user device 100 to visit plural websites hosted by plural web servers 105*a*-*m*. The plug-in 130 communicates the browsing interaction data to the video server 110. In normal day-to-day behavior logging, the system performs a statistical linkage with other tasks. In embodiments, the plug-in 130 allows the user to record the likes and dislikes of the sub-components of the demonstration video. Using these ratings of the sub components, the system changes individual sub-tasks in the demonstration video. In one embodiment, the change is performed by the video server. In another embodiment, the change is implemented at the client side using, for example, scripting.

In embodiments, the system is seeded with a range of demonstration video sub-components and behaviors for different object types and/or topics. In this example, for each of those objects, the system ascertains a spectrum of values at an individual level. For example, to blend the constituent tasks of the demonstration video, the system can leverage existing web testing tools, which can be used to ascertain what type of object a web element is. For example, if a web element "Product_Buying" is appropriate (because of the earlier statistical analysis) and it is displayed in the correct order, then there is an increased probability of positive user experience. In embodiments, the relative importance of the individual object (e.g., types, content, behavior, etc.) and the overall look and feel is also modelled. For example, the system may analyze the user's previous offline activity to determine that information.

In accordance with further aspects of the invention, the system is configured to include a crowdsourced component of creation of the videos based on the navigation of top users. Hence, for example, top five users normally follow a given flow, so the system will create a video of that flow as a recommendation for new users. A normalization factor takes into account averaging of group of users in correlation with their satisfaction ratings (sentiment analysis). In embodiments, the engine monitors results using a reinforcement learning model with the goal of maximization of user satisfaction level while navigating through the video and website. This is an iterative step to continue evolving the videos based on time-steps and modulating personality traits.

As will be understood from the description herein, an embodiment of the invention includes a computer-implemented method comprising: determining a pattern of behavior from the user interactions that indicate user actions taken with media content; and creating media content for a content providing source based on the determined pattern of behavior from previously stored user interactions with media content sharing similarities to the content providing source.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining, by a computer device, an interaction pattern of a first website based on actions of plural users at the first website;
    determining, by the computer device, that a first user has interacted with a second website;
    determining, by the computer device, that the interaction pattern of the first website comprises use of the second website by the plural users;
    comparing, by the computer device, the interaction pattern of the first website with an interaction patten of the plural users at the second website;
    generating, by the computer device, a demonstration video based on the comparing, the demonstration video comprising showing the plural users using content from the first website; and
    presenting, by the computer device, the demonstration video to the first user visiting the first website for a first time,
    wherein the demonstration video comprises video screen captures of a sequence of actions defined by the interaction pattern of the first website, and
    the video screen captures are screen captures of the first website.

2. The method of claim 1, wherein the actions of the plural users are selected from the group consisting of: navigating within the first website via links in the first website; providing input to the first website; reading text on the first website; viewing pictures on the first website; viewing videos on the first website; and listening to audio on the first website.

3. The method of claim 1, wherein the determining the interaction pattern of the first website comprises determining a most common series of actions that the plural users perform in the first website.

4. The method of claim 3, wherein the determining the interaction pattern of the first website is performed using a neural network.

5. The method of claim 1, further comprising:
    determining a change in the first website;
    updating the demonstration video based on the change;
    determining the change is a change of interest to the first user;
    determining the change is not a change of interest to a second user; and
    presenting the updated demonstration video to the first user a next time the first user visits the first website after the determining the change in the first website, without presenting the updated demonstration video to the second user a next time the second user visits the first website after the determining the change in the first website.

6. The method of claim 5, wherein the determining the change comprises determining a change in a website component of the first website included in the demonstration video, and wherein the determining the change is a change of interest to the first user is based on a profile of the first user.

7. The method of claim 6, wherein the website component is at least one selected from the group consisting of: pictures; tables; paragraphs; hyperlinks; Cascading Style Sheets (CSS); Hypertext Markup Language (HTML) elements; and JavaScript elements.

8. The method of claim 1, further comprising determining categories of the plural users, wherein:
    the determining the interaction pattern of the first website comprises determining a respective interaction pattern for each respective one of the determined categories;
    the generating the demonstration video comprises generating a respective demonstration video for each one of the respective interaction patterns; and
    the presenting the demonstration video to the first user comprises presenting one of the respective demonstration video based on determining which one of the categories the first user is in.

9. The method of claim 1, wherein the presenting is performed within a predefined amount of time of the first user accessing the first website.

10. A computer program product, the computer program product comprising a computer readable storage medium having program instructions embodied therewith, the program instructions executable by a computer device to cause the computer device to:
    determine an interaction pattern of a first website based on actions of plural users at the first website;
    determine that a first user has interacted with a second website;
    determine that the interaction pattern of the first website comprises use of the second website by the plural users;
    compare the interaction pattern of the first website with an interaction patten of the plural users at the second website;
    generate a demonstration video based on the comparing, the demonstration video comprising showing the plural users using content from the first website; and
    present the demonstration video to the first user visiting the first website for a first time, wherein the demonstration video comprises video screen captures of a sequence of actions defined by the interaction pattern of the first website, and the video screen captures are screen captures of the first website.

11. The computer program product of claim 10, wherein the interaction patten of the plural users at the second website comprises one selected from the group consisting of: navigating within the second website; providing input to the second website; reading text on second website; viewing pictures on the second website; viewing videos on the second website; and listening to audio on the second website.

12. The computer program product of claim 10, wherein the program instructions cause the computer device to:
determine a change in the first website;
update the demonstration video based on the change; and
present the updated demonstration video to the first user a next time the first user visits the first website after the determining the change in the website,
wherein the determining the change comprises determining a change in a website component included in the demonstration video, the website component being at least one selected from the group consisting of: pictures; tables; paragraphs; hyperlinks; Cascading Style Sheets (CSS); Hypertext Markup Language (HTML) elements; and JavaScript elements.

13. The computer program product of claim 10, wherein the presenting is performed within a predefined amount of time of the first user accessing the website.

14. A system comprising:
a processor, a computer readable memory, and a computer readable storage medium;
program instructions to determine an interaction pattern of a first website based on actions of plural users at the first web site;
program instructions to determine that a first user has interacted with a second website;
program instructions to determine that the interaction pattern of the first website comprises use of the second website by the plural users;
program instructions to compare the interaction pattern of the first website with an interaction patten of the plural users at the second website;
program instructions to generate a demonstration video based on the comparing, the demonstration video comprising showing the plural users using content from the first website; and
program instructions to present the demonstration video to the first user visiting the first website for a first time,
wherein the demonstration video comprises video screen captures of a sequence of actions defined by the interaction pattern of the first website,
the video screen captures are screen captures of the first website, and
the program instructions are stored on the computer readable storage medium for execution by the processor via the computer readable memory.

15. The system of claim 14, further comprising program instructions to:
determine a change in the first website;
update the demonstration video based on the change; and
present the updated demonstration video to the first user a next time the first user visits the first website after the determining the change in the first website.

16. The system of claim 15, wherein the determining the change comprises determining a change in a website component included in the demonstration video, the website component being at least one selected from the group consisting of: pictures; tables; paragraphs; hyperlinks; Cascading Style Sheets (CSS); Hypertext Markup Language (HTML) elements; and JavaScript elements.

17. The system of claim 14, wherein the interaction pattern of the first website comprises a pattern of navigating through the first website.

\* \* \* \* \*